(12) United States Patent
Huang et al.

(10) Patent No.: US 10,965,655 B2
(45) Date of Patent: Mar. 30, 2021

(54) MULTIPLE PDN CONNECTIONS OVER UNTRUSTED WLAN ACCESS

(71) Applicant: TELEFONAKTIEBOLAGET LM ERICSSON (PUBL), Stockholm (SE)

(72) Inventors: Zhenjie Huang, Shenzhen (CN); Wenzhe Lu, Shenzhen (CN); Songhui Sun, Shenzhen (CN); Changzheng Wu, Shenzhen (CN); Wei Xu, Shenzhen (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 492 days.

(21) Appl. No.: 15/575,466

(22) PCT Filed: May 28, 2015

(86) PCT No.: PCT/CN2015/080052
§ 371 (c)(1),
(2) Date: Nov. 20, 2017

(87) PCT Pub. No.: WO2016/187871
PCT Pub. Date: Dec. 1, 2016

(65) Prior Publication Data
US 2018/0191493 A1 Jul. 5, 2018

(51) Int. Cl.
*H04W 36/22* (2009.01)
*H04W 76/10* (2018.01)
(Continued)

(52) U.S. Cl.
CPC .......... *H04L 63/061* (2013.01); *H04L 9/0819* (2013.01); *H04L 9/0838* (2013.01);
(Continued)

(58) Field of Classification Search
CPC ........ H04L 63/16; H04L 69/24; H04W 36/22; H04W 76/10; H04W 76/12; H04W 76/15;
(Continued)

(56) References Cited

U.S. PATENT DOCUMENTS

2010/0199332 A1    8/2010  Bachmann et al.
2011/0103340 A1*   5/2011  Zhu ................... H04W 36/0011
                                                           370/329

(Continued)

FOREIGN PATENT DOCUMENTS

EP    1158826 A2    11/2001
EP    2166724 A1     3/2010
(Continued)

OTHER PUBLICATIONS

Extended European Search Report issued in corresponding EP Application No. 15892952.1 dated Jan. 28, 2019, 07 Pages.

*Primary Examiner* — Morshed Mehedi
*Assistant Examiner* — Kalish K Bell
(74) *Attorney, Agent, or Firm* — Patent Portfolio Builders, PLLC

(57) ABSTRACT

Embodiments of this invention relate to methods and apparatus for establishing additional simultaneous packet data network (PDN) connections between a User Equipment (UE) and an evolved packet core network (EPC) over an untrusted WiFi network. The UE is attached to the EPC through a security gateway over a first PDN connection over which the UE is authenticated and has established an Internet Key Exchange Security Association (IKE SA) and a first Internet Protocol Security SA (IPSec SA). The UE then establishes an additional PDN connection using a new IKE request/response exchange or an enhanced IKE CREATE_CHILD_SA exchange that is cryptographically protected using algorithms and keys negotiated during the first PDN connection, hence improving delay and battery life of the (Continued)

(method in SeGW)

UE as the UE no longer needs, for each additional PDN connection, to negotiate an individual IKE SA and to authenticate the UE.

12 Claims, 7 Drawing Sheets

(51) Int. Cl.
    *H04W 76/12*     (2018.01)
    *H04W 76/15*     (2018.01)
    *H04W 76/32*     (2018.01)
    *H04W 76/34*     (2018.01)
    *H04W 88/16*     (2009.01)
    *H04W 88/18*     (2009.01)
    *H04W 92/10*     (2009.01)
    *H04L 9/14*     (2006.01)
    *H04L 29/06*     (2006.01)
    *H04W 12/04*     (2021.01)
    *H04L 9/08*     (2006.01)
    *H04W 80/04*     (2009.01)

(52) U.S. Cl.
    CPC .............. *H04L 9/14* (2013.01); *H04L 63/029* (2013.01); *H04L 63/0281* (2013.01); *H04L 63/164* (2013.01); *H04W 12/04071* (2019.01); *H04W 76/15* (2018.02); *H04L 63/0272* (2013.01); *H04W 80/04* (2013.01)

(58) Field of Classification Search
    CPC ..... H04W 76/32; H04W 76/34; H04W 88/16; H04W 88/18; H04W 92/10
    See application file for complete search history.

(56) References Cited

U.S. PATENT DOCUMENTS

| | | | |
|---|---|---|---|
| 2011/0225632 A1* | 9/2011 | Ropolyi | H04W 48/16 726/4 |
| 2016/0212098 A1* | 7/2016 | Roch | H04L 63/0428 |
| 2016/0285627 A1* | 9/2016 | Sedlacek | H04L 9/0841 |
| 2016/0295385 A1* | 10/2016 | Wang | H04W 12/0608 |

FOREIGN PATENT DOCUMENTS

| | | |
|---|---|---|
| WO | 2009/058714 A2 | 5/2009 |
| WO | 2009/083429 A1 | 7/2009 |

\* cited by examiner

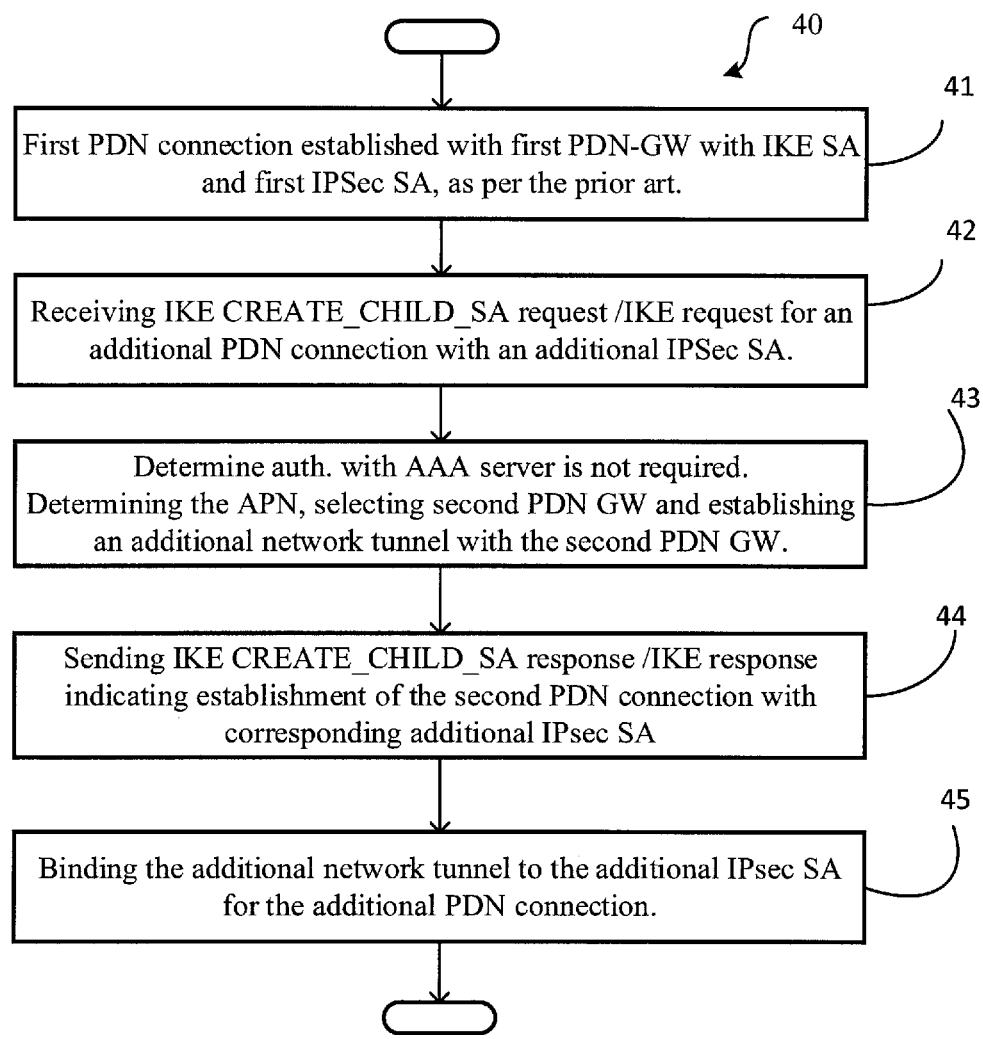
Figure 4 (method in SeGW)

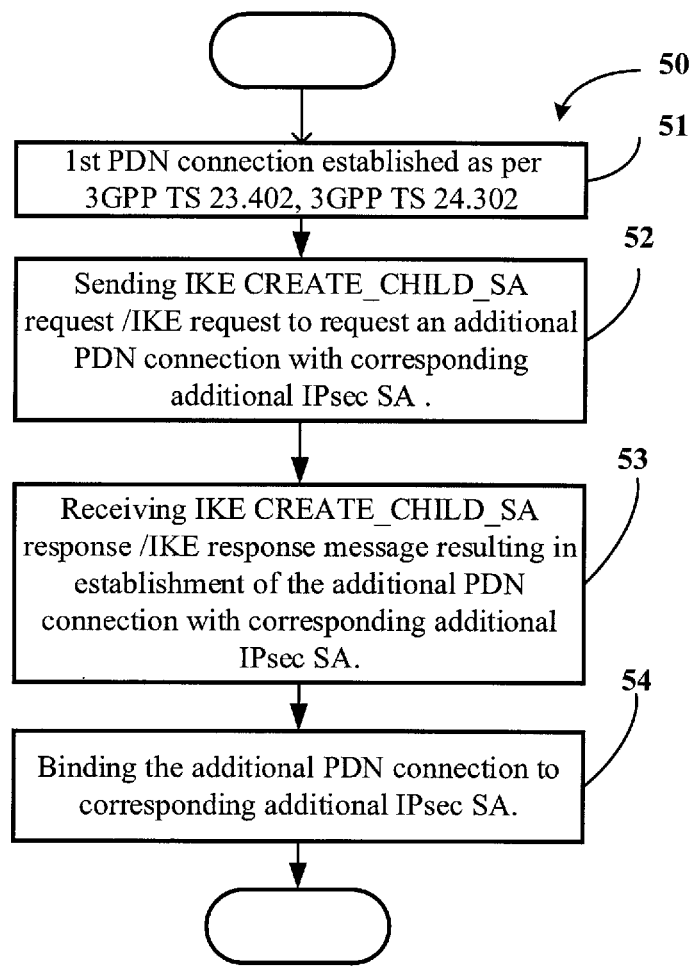
Figure 5 (Method in UE)

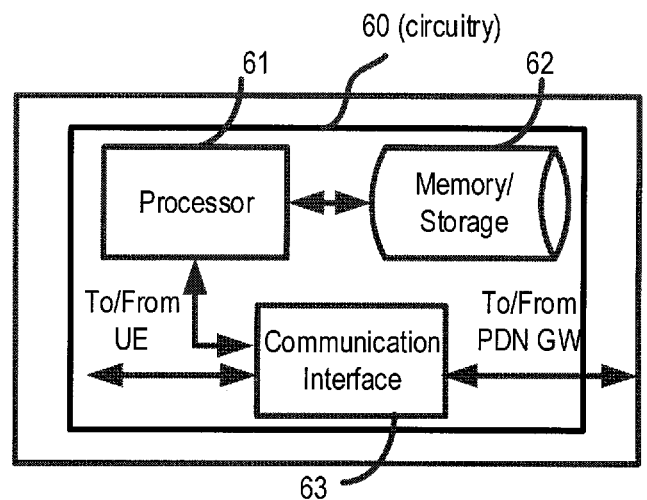
Figure 6 (SeGW)
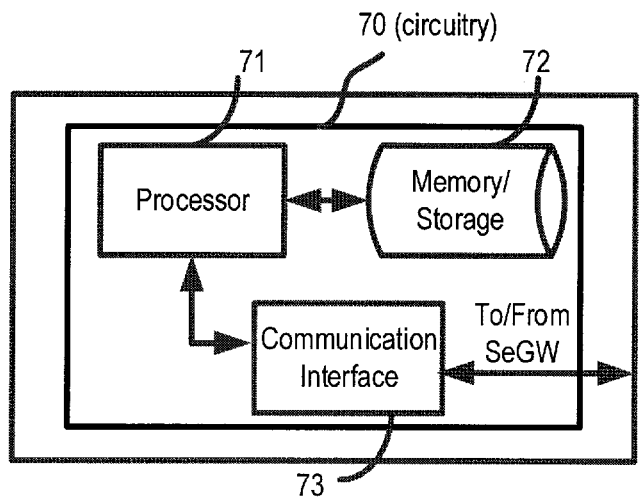
Figure 7 (UE)

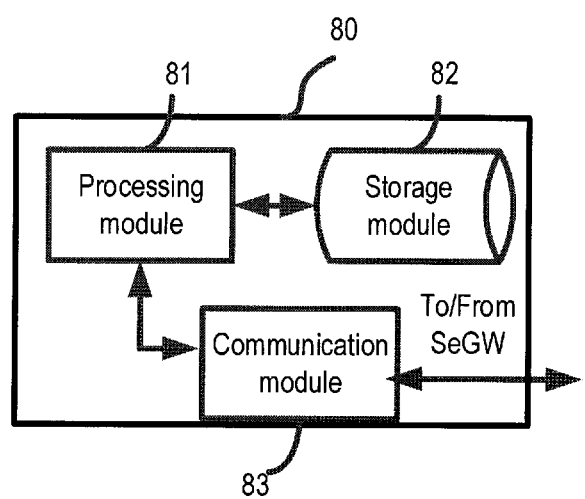
Figure 8 (UE)

MULTIPLE PDN CONNECTIONS OVER UNTRUSTED WLAN ACCESS

CROSS-REFERENCE TO RELATED APPLICATION

This application is a U.S. National Stage Filing under 35 U.S.C. § 371 of International Application No. PCT/CN2015/080052, filed on May 28, 2015, the disclosure of which is fully incorporated herein by reference.

TECHNICAL FIELD

This disclosure relates generally to establishing multiple packet data network connections over a packet core network.

BACKGROUND

Since the advent of Mobile internet technologies, users and their demand for the high rate data access has been growing exponentially. Radio access technologies have evolved to support broadband accesses and the packet core network has evolved to cope with packet data demands and the evolved radio access technologies. Long Term Evolution, LTE, specified by the third Generation Partnership Project, 3GPP is a broadband cellular IP access technology that provides increased speed and capacity. The 3GPP-specified Evolved Packet Core, EPC, is the packet core network specified for LTE access. Additionally, the EPC is becoming a common core network for packet switched services for 2G and 3G radio access networks as well as WiFi local access network, WLAN, as specified in 3GPP technical specifications TS 23.401 and TS 23.402.

The EPC sits between the radio access network and packet data networks, PDNs which may be intranets, extranets or the internet. The EPC can operate with IPv4 and/or IPv6 addressing schemes when interworking with a PDN. The interworking point between EPC and the PDNs is the SGi reference point.

The EPC consists of a packet core domain and a user domain. The user domain provides the complete updated information of users on request. It maintains a database to support roaming mobility of the subscriber as well as authentication, authorization and accounting. The user domain consists of multiple nodes comprising Home Subscriber Server, HSS, Authentication Authorization and Accounting, AAA and policy server. The packet core domain provides IP services over 2G (GSM), 3G (WCDMA/HSPAICDMA), 4G (LTE) and Non-3GPP technologies such as WiFi or Wimax.

To provide packet services to UEs attached through the LTE radio access network, the packet core domain uses a Mobility Management Equipment, MME, a Serving Gateway, SGW, and a Packet Data Network Gateway, PDN-GW. The PDN-GW is the demarcation point between the IP networks and the packet core domain and acts as the common anchor point for the PDN connections of UEs connecting or moving from one access network to a different access network while maintaining the same IP address(es).

Using LTE access, UEs connect to EPC via a PDN connection. A PDN connection is an association between a UE represented by an IPv4 address and/or an IPv6 prefix and a PDN represented by an Access Point Name, APN. A PDN connection comprises one or more evolved packet system EPS bearers. The first EPS bearer is established when the UE connects to a PDN, and remains established throughout the lifetime of the PDN connection to provide the UE with an always-on IP connectivity to that PDN. That first EPS bearer is referred to as the default EPS bearer. Any additional EPS bearer that is established by the UE over the LTE access network for the same PDN connection is referred to as a dedicated EPS bearer. An EPS bearer established over an LTE radio access network, RAN, consists of multiple concatenating segments which comprises of a radio bearer from the UE to the base station, known as the evolved node B, eNB, an S1 bearer between the eNB and the SGW and the S5/S8 bearer between the SGW and the PDN-GW.

A UE connected over LTE Radio Access Network, RAN, may establish multiple PDN connections and connect to multiple PDNs simultaneously. Each PDN connection is characterized by a PDN type which indicates the type of connectivity requested for the PDN, i.e., Internet Protocol, IPv4, IPv6 or IPv4/IPv6 and an Access Point Name, APN. When establishing multiple PDN connections for a UE over EPC, one or multiple PDN-GWs can be used depending on the Access Point Name, APN. It is also possible for a UE to have multiple PDN connections with the same APN, in which case all the PDN connections are provided by the same PDN-GW.

UEs with subscriptions in an EPC network can additionally establish a PDN connection with the PDN-GW in the EPC through an untrusted WLAN. In this scenario, the EPC network does not trust the WLAN which is typically the case when the UE connects to its EPC services through a public WiFi hotspot or through a Wi-Fi hotspot that is not owned by the EPC operator. The packet core domain of the EPC includes an evolved Packet Data Gateway, ePDG, which is used as a gateway to the EPC and is responsible for establishing a secure packet data connection over the untrusted WLAN through the packet core domain to the PDN-GW as described in 3GPP TS 23.402. The secure packet data connection consists of an IP security, IPSec, tunnel between the UE and the ePDG established over the SWu interface and of a GPRS tunneling protocol, GTP, tunnel between the ePDG and the PDN-GW established over the S2b interface.

The IPSec protocols comprising Internet Key Exchange version 2, IKEv2, defined by the Internet Engineering Task Force, IETF, RFC 5996, IP Encapsulating Security Payload, ESP, defined by the IETF RFC 4303, and IPSec, defined by the IETF RFC 4301 are used over the SWu interface between the UE and the ePDG. The IKEv2 protocol was originally designed by the IETF to dynamically negotiate keys for IPSec tunnel. However, in the SWu interface, the IKEv2 protocol is used to implement UE attach and PDN connection establishment procedures. When IKEv2 initial exchanges (including IKE_SA_INIT and IKE_AUTH) are successfully setup, the UE attach procedure including user authentication and first/default PDN connection is completed, and the IKE Security Association, SA and the first IPSec SA or tunnel are setup. The IPSec tunnel is used as a user data path for the PDN connection. Notably, the IKE-_SA_INIT exchange is used to setup the IKE SA including IKE SPI assignment, negotiate cryptographic algorithms, exchange nonces, and do a Diffie-Hellman exchange, DH, the latter is described in "New Directions in Cryptography", IEEE Transactions on Information Theory, V.IT-22 n. 6, June 1977. The IKE_AUTH exchange is used authenticate the previous IKE_SA_INIT messages, exchange identities and certificates, as well as establish the first IPSec SA or tunnel. During IKE_AUTH exchange, user authentication, profile provisioning IPSec and IP address assignment for the first PDN connection are completed. Once the IKE_AUTH exchange is completed, the first/default PDN connection is setup with the corresponding first IPSec tunnel as the user plane tunnel over the SWu interface. To release the first/default PDN connection, an IKEv2 INFORMATIONAL exchange is used to delete the IKE SA and the first IPSec SA.

The current 3GPP standards, 3GPP TS 23.402 and 3GPP 24.301, support multiple PDN connections over the SWu interface. However, each additional PDN connection establishment uses its own individual initial IKE exchange procedure comprising an IKE_SA_INIT and an IKE_AUTH exchange. In other words, for each PDN connection, an IKE SA is established that comprises negotiating cryptographic algorithms, exchanging nonces, and doing a Diffie-Hellman exchange, DH, all of which use large number of calculation that require high processing power at both the ePDG and the UE. The IKE_AUTH exchange leading to establishment of the IPSec SA also requires extensive processing, computation and signaling not only between the UE and the ePDG but also between the ePDG and the authenticator, i.e., the AAA/HSS server. Large number of calculations and signaling tend to drain the battery life of the UE making implementation and deployment of multiple PDN connections with existing solutions quite costly and not efficient. Additionally, the AAA/HSS authorizes and sends the user profile to the ePDG for each established PDN connection. The ePDG should store the user profile for each additional PDN connection for the UE. Although, the user profiles associated to the established PDN connections for the UE share common attributes, they are stored and treated as individual profiles. As a result, memory usage at the ePDG is not efficient.

SUMMARY

The following acronyms are used throughout this disclosure.
3GPP 3rd Generation Partnership Project
AAA Authorization, Authentication, and Accounting
APN Access Point Name
ePDG evolved Packet Data Gateway
EPC Evolved Packet Core
GTP GPRS Tunneling Protocol
HSS Home Subscriber Server
IKE Internal Key Exchange
IP v4 Internet protocol version 4
IP v6 Internet protocol version 6
IPSec Internet Protocol Security
LTE Long term evolution
PDN Packet Data Network
SA Security Association
S2b The interface between ePDG and P-GW
SeGW Security Gateway
SPI Security Parameter Index
SWm The interface between ePDG and 3GPP AAA server
SWu The interface between UE and ePDG
UE User Equipment It is an object of the present invention to obviate or mitigate at least one disadvantage of the prior art and to enable the User Equipment, UE, and the security gateway (e.g., ePDG as specified in 3GPP TS 23.402) to establish additional PDN connections using one simple IKE exchange (request/response) without establishing a new IKE SA and performing a new authentication. The processor and signaling intensive initial IKE exchange comprising authentication of the UE is performed during establishment of the first PDN connection only where the IKE SA and the first IPSec SA are established. The initial IKE exchanges comprising the IKE_SA_MIT exchange and the IKE_AUTH exchange will not be executed when establishing the additional PDN connections. The additional PDN connections are thus established faster with less processing requirements in the UE and the security gateway and less signaling over the air interface and in the network. To establish additional PDN connections, an enhanced Internet Key Exchange, IKE, CREATE_CHILD_SA exchange can be used. Alternatively, a new IKE exchange and message herein referred to simply as IKE request/IKE response message could also be used. The particularity of those exchanges is that they are cryptographically protected using cryptographic algorithms and keys negotiated/established in the IKE SA that is established at the first PDN connection. Although a new IKE exchange and message can be created and used, embodiments in the present invention are described using an enhanced IKE CREATE_CHILD_SA exchange. The new IKE request/response exchange or the enhanced IKE CREATE_CHILD_SA exchange establishes an additional IPsec SA also referred to as IPsec child SA. In this disclosure, additional IPsec SA and IPsec child SA are used interchangeably.

According to one embodiment, a security gateway has established for a UE a first PDN connection with a first PDN GW, the first PDN connection establishment comprises an IKE SA and a first IPsec SA establishment. The security gateway receives an IKE request message to establish an additional IPSec SA for an additional PDN connection and where the IKE request message comprises the PDN type which may indicate an IPv4, an IPv6 or a simultaneous IPv4 and IPv6 address type. The security gateway may receive the APN in the IKE request message or if none is received, it uses the default APN that is received from the AAA server during establishment of the first PDN connection. The IKE request message is cryptographically protected using cryptographic algorithms and keys established in the IKE SA established at the first PDN connection. The Security gateway then selects a second PDN-GW in the EPC for establishing an additional network tunnel for the additional IPSec SA. The additional network tunnel may be GTP based or proxy Mobile IP based. Depending on the APN resolution the second PDN-GW may be the same as the first PDN-GW.

Once the additional network tunnel is established, the security gateway sends an IKE response message comprising the UE assigned address by the second PDN-GW. The UE assigned address may be an IPv4 address, or an IPv6 prefix or both and may be encoded in an IKE Configure Reply Configuration Payload, CFG_REPLY CP. The IKE response message may additionally comprise the APN used for the additional PDN connection and which may be encoded in an identification payload. Additionally, the response message may include the second PDN-GW address selected for the additional PDN connection. The IKE response message indicates establishment of the additional IPSec SA and the additional PDN connection with the PDN-GW is thus established. The security gateway then binds the additional IPSec SA to the additional network tunnel in order to route the traffic to and from the additional IPSec tunnel from and to the corresponding network tunnel.

In one embodiment, the PDN type in the IKE Request message is included in an IKE Configure Request Configuration Payload, CFG_REQUEST CP. If the APN is sent in the IKE Request message it may be included in an identification payload.

In a different embodiment supporting handover from one radio network such as LTE or WiFi to the untrusted WiFi network, the security gateway receives the IKE request message, this time comprising the UE IP address previously allocated when the UE was attached to the previous radio network prior to handover. The UE IP address may be encoded in a traffic selector payload. The presence of the UE IP address in the message indicates handover of a PDN connection. In this scenario, the UE may also include the APN used for the PDN connection in the previous radio network and may also include the previously used PDN-GW address.

In yet another embodiment, the security gateway releases the additional PDN connection with the additional network tunnel using an IKE Informational exchange. The IKE informational exchange comprises a delete payload indicating a security parameter index that corresponds to the additional IPSec SA established for the additional PDN connection.

According to another embodiment, a UE establishes a first PDN connection comprising establishment of an IKE SA and a first IPSec SA, as per the prior art. The UE the requests an additional PDN connection to the EPC over the untrusted access network by sending an IKE request message to a security gateway to request establishment of an additional IPSec SA instead of initiating a new initial IKE exchange consisting of an IKE_SA_INIT exchange and an IKE_AUTH exchange. The IKE request message comprises a PDN type which may be of type IPv4, IPv6 or both which may be encoded in an IKE Configure Request Configuration Payload, CFG_REQUEST, CP. The IKE request message may also include an APN. In response to the IKE request message, the UE receives an IKE response message that comprises the UE assigned address information which may be an IPv4 address, an IPv6 prefix or both indicating successful establishment of the additional PDN connection and of the additional IPsec SA. The IKE response message may also include the traffic selector. The UE binds the additional IPSec SA to the additional PDN connection and may use the traffic selector to route the traffic associated to the additional PDN connection over the additional IPSec SA or tunnel.

In another embodiment supporting handover from a radio access network such as LTE or another WiFi network to the untrusted WiFi network, the UE indicates handover of any additional PDN connection by sending an IKE request message that comprises the previously allocated IP address for the additional PDN connection and where the IP address may be encoded in a traffic selector payload. The UE starts to handover the first PDN connection by starting and completing the initial exchange comprising the IKE_SA_NIT exchange and IKE_AUTH exchange, with the security gateway. Afterwards, the UE sends for each additional PDN connection an IKE request message, where each message comprises the previously allocated IP address for the additional PDN connection. The IKE request message may also include the previously used APN or the previously selected PDN-GW address for the additional PDN connection in order to allow the security gateway to maintain the same PDN-GWs for the additional PDN connections at handover. Alternatively, the security gateway may receive from the AAA/HSSS the APNs and/or PDN-GWs used for the additional PDN connections established over the radio access network prior to handover.

BRIEF DESCRIPTION OF THE DRAWINGS

Embodiments of the present invention will now be described, by way of example only, with reference to the attached Figures, wherein:

FIG. 4 illustrates a flowchart of a method executed at a security gateway for establishing additional PDN connections, according to an embodiment.

FIG. 5 illustrates a flowchart of a method executed at a User Equipment for establishing additional PDN connections, according to an embodiment.

FIG. 6 is a schematic illustration of a security gateway, according to an embodiment.

FIG. 7 is a schematic illustration of a User Equipment, according to an embodiment.

FIG. 8 is a schematic illustration of a User Equipment, according to another embodiment.

DETAILED DESCRIPTION

The various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

Many aspects of the invention are described in terms of sequences of actions or functions to be performed by elements of a computer system or other hardware capable of executing programmed instructions. It will be recognized that the various actions could be performed by specialized circuits, by program instructions being executed by one or more processors, or by a combination of both. Moreover, the invention can additionally be considered to be embodied entirely within any form of computer readable carrier or carrier wave containing an appropriate set of computer instructions that would cause a processor to carry out the techniques described herein.

Figure 1:
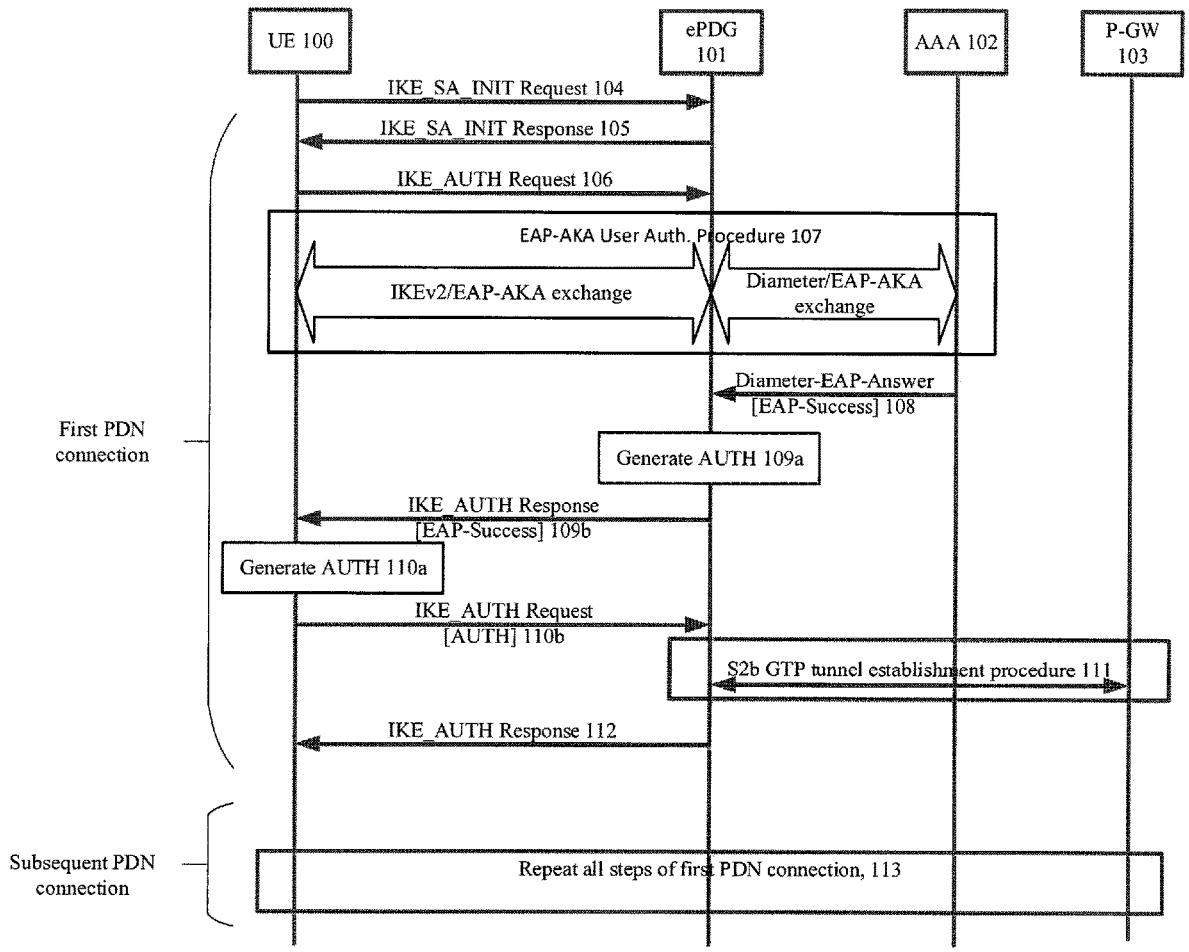
FIG. 1 is a sequence diagram of establishing multiple PDN connections according to the prior art.

FIG. 1 illustrates a sequence diagram for establishing multiple PDN connections over an untrusted 3GPP, e.g., WiFi access using IKEv2 and IPSec, according to the prior art as specified in current versions of 3GPP TS 23.402 and 3GPP TS 33.402. FIG. 1 illustrates a UE 100 that supports WiFi and another radio access technology such as LTE. The UE 100 uses an unsecure WLAN access to connect over the SWu interface to the security gateway, i.e., ePDG 101 for secure access to EPC services. The security gateway, i.e., ePDG 101 interfaces with the AAA server 102 over the SWm interface, which is a Diameter base interface for UE authentication and authorization. The security gateway, i.e., ePDG 101 interfaces with the PDN-GW 103 over the S2b interface where the UE PDN connection is anchored.

When the UE 100 determines it needs to attach to the EPC through a selected ePDG 101, the UE 100 initiates IKE_SA_INIT and IKE_AUTH exchanges with the ePDG 101. These initial exchanges generally consist of four messages (IKE_SA_INIT Request/Response and IKE_AUTH Request/Response). The first pair of messages (IKE_SA_INIT) negotiate cryptographic algorithms, exchange nonces, and do a Diffie-Hellman exchange and the second pair of messages (IKE_AUTH) authenticate the previous IKE_SA_INIT messages, exchange identities and certificates, and establish the first IPsec SA.

At step 104 and step 105, the UE 100 and the ePDG 101 exchange the first pair of IKE_SA_INIT messages. At step 106, the UE 100 sends IKE_AUTH message to ePDG 101 to start negotiation of first IPSec SA, where the UE 100 sends the user identity in the IDi payload and the APN information in the IDr payload. The UE 100 includes the configuration payload (CFG_REQUEST) within the IKE_AUTH request message to obtain an IPv4 and/or IPV6 home IP Address. Additionally, the UE omits the AUTH parameter to indicate to the ePDG 101 that it wants to use EAP over IKEv2.

At step 107, the UE 100 and the AAA server 102 exchange EAP messages through the ePDG 101 for authentication and key exchange for establishment of the first IPSec SA or IPSec tunnel. The EAP messages are carried over IKEv2 between the ePDG 101 and the UE 100 and over the AAA protocol, e.g., Diameter, between the ePDG 101 and the AAA server 102. The authentication method and the number of EAP messages exchanged between the UE 100 and the AAA server 102 vary with the EAP method that is executed. In FIG. 1, EAP-AKA as specified in RFC 4187 is used. Step 107 is a simplified illustration of the EAP-AKA exchange of messages between the UE 100 and the AAA server 102 through the ePDG 101 and starts with the ePDG 101 sending an Authentication and Authorization Request message to the AAA Server 102 after receiving the IKE_AUTH Request message at step 106. The Authentication and Authorization Request message contains the user identity and the APN. The AAA Server 102 retrieves the authentication vectors associated with the user identity and sends to the ePDG 101 an Authentication and Authorization Response message that includes an EAP Request-AKA Challenge to initiate the authentication challenge. The ePDG 101 prepares an IKE_AUTH Response message that includes the ePDG 101 own identity, a certificate, the AUTH parameter to protect the previous message sent to the UE 100 at step 105 and the EAP Request-AKA challenge received from the AAA server 102. When the UE 100 receives the IKE_AUTH Response message from the ePDG 101, it checks the authentication parameters and responds to the AKA challenge by sending to the ePDG 101 another IKE_AUTH Request message containing the EAP Response-AKA Challenge. The ePDG 101 forwards the EAP-Response/AKA-Challenge message to the AAA Server 102 which checks if the authentication response from the UE 100 is correct.

The AAA Server 102 in FIG. 1 will also check the user's subscription for authorization and at step 108, if all checks are successful; the AAA Server 102 sends to the ePDG 101 the final Authentication and Authorization Answer indicating success including the relevant service authorization information, an EAP Success message and the key material. At step 109a, The ePDG 101 uses the received key material to generate the AUTH parameter in order to authenticate the IKE_SA_INIT phase messages as these two first messages had not been previously authenticated given that there was no key material available yet. At step 109b, the ePDG 101 sends to the UE 100 an IKE_AUTH Response message comprising the EAP Success message received at step 108.

At step 110a, the UE uses its own key material to generate the AUTH parameter to authenticate the first IKE_SA_INIT message and at step 110b, the UE sends to the ePDG 101 an IKE_AUTH Request message containing the AUTH parameter it has generated. At step 111, the ePDG 101 compares the received AUTH parameter from the UE with its own generated AUTH parameter and if identical; the UE 100 is considered authenticated. As specified in 3GPP TS 23.402, the ePDG 101 proceeds with establishment of the first PDN connection by initiating a request for establishment of a GTP tunnel between the ePDG 101 and a selected PDN-GW 103. The ePDG 101 sends a GTP Create Session Request to the PDN-GW 103. The PDN-GW 103 assigns an IPv4 address and/or an IPv6 prefix for the UE and sends GTP Create Session Response message to ePDG 101 that comprises the assigned IPv4 address and/or an IPv6 prefix and the GTP tunnel establishment is completed. Subsequently, the ePDG 101 proceeds to calculate the AUTH parameter which authenticates the second IKE_SA_INIT message. At step 112, the ePDG 101 sends to the UE 100 an IKE_AUTH Response message comprising the AUTH parameter and a configuration payload (CFG_REPLY) that comprises the assigned IPv4 address/IPv6 prefix. At this point, the IKE SA and first IPSec SA or first IPSec tunnel are established, the IKEv2 parameters and IKEv2 negotiation are completed. The first PDN connection, consisting of the concatenation of the IPSec tunnel and of the GTP tunnel is finally established.

At step 113, the UE determines that a subsequent PDN connection should be established. According to the existing prior art 3GPP TS 23.402 and 3GPP TS 24.302, the UE 100 initiates another IKE_SA_INIT and IKE_AUTH exchanges with the ePDG 101. Steps 104 to 112 as described above have to be repeated for each requested additional PDN connection. Notably, each PDN connection establishment and release uses its own individual IKE procedure as described above. For each IPSec/GTP tunnel establishment procedure, the UE shall indicate to the ePDG an APN to the desired PDN and an attach type indication as specified in 3GPP TS 24.302. Using the prior art procedure, an IKE SA is established for each PDN connection, encompassing negotiating cryptographic algorithms, exchanging nonces, and doing a Diffie-Hellman exchange, DH, all of which use large number of calculation that require high processing power at both the ePDG 101 and the UE 100. The IKE_AUTH exchange leading to establishment of the IPSec SA also requires extensive processing, computation and signaling not only between the UE 100 and the ePDG 101 but also between the ePDG 101 and the authenticator, i.e., the AAA server 102. Large number of calculations and signaling tend to drain the battery life of the UE 100 making implementation and deployment of multiple PDN connections with existing solutions quite costly and not efficient. Additionally, the AAA server 102 authorizes and sends the user profile to the ePDG 101 for each established PDN connection. The ePDG 101 is expected to store the user profile for each additional PDN connection for the UE 100. Although, the user profiles associated to the established PDN connections for the UE 100 share common attributes, they are stored and treated as individual profiles. As a result, memory usage at the ePDG 101 is not efficient.

FIG. 1 illustrates an example using GTP as the network mobility protocol between the ePDG 101 and the PDN-GW 103; however, other network mobility protocols such as Proxy Mobile IP may also be used.

Figure 2:
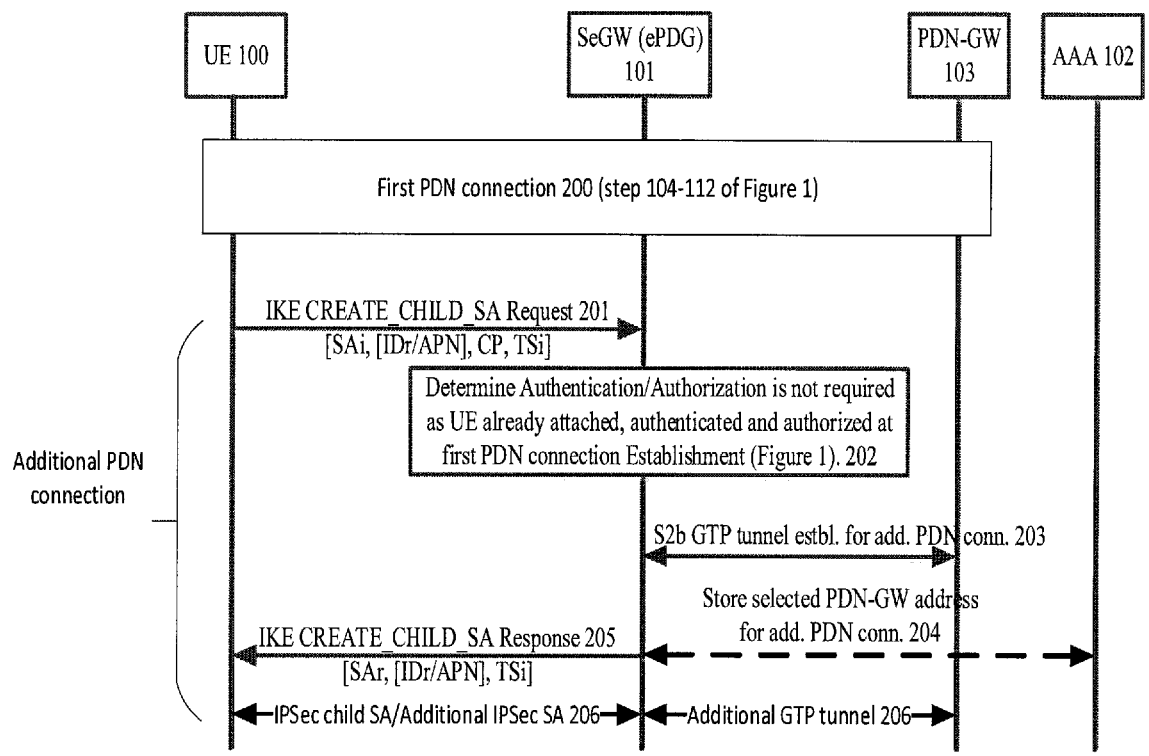
FIG. 2 illustrates a sequence diagram of establishing multiple PDN connections, according to an embodiment.

FIG. 2 illustrates establishment of an additional PDN connection over an untrusted 3GPP access, e.g., WiFi, using IKEv2 and IPSec according to an embodiment. The security gateway used in this embodiment is an ePDG as specified in 3GPP 23.402, however other security gateways could also be used. To establish additional PDN connections, the ePDG can use an enhanced IKE CREATE_CHILD_SA exchange or can use a new IKE exchange and message herein referred to simply as IKE request/IKE response message. The enhanced IKE CREATE_CHILD_SA exchange or the new created IKE exchange comprises a pair of Request-Response messages and is cryptographically protected using the cryptographic algorithms and keys negotiated in the initial IKE exchange (IKE_SA_INIT) carried out during establishment of the first PDN connection as shown in step 104-112 of FIG. 1. The new IKE request/response exchange or the enhanced IKE CREATE_CHILD_SA exchange establishes an additional IPsec SA also referred to as IPsec child SA. In this disclosure, additional IPsec SA and IPsec child SA are the same and are used interchangeably. Embodiments hereinafter are described using an enhanced IKE CREATE_CHILD_SA exchange and using IPsec child SA as the additional IPsec SA.

Step 200 in FIG. 2, corresponds to the established first PDN connection comprising establishment of an IKE SA and a first IPSec SA according to step 104 to step 112 of FIG. 1 described above, thereafter the UE 100 is considered attached to the network. At step 201, the UE 100 determines that a subsequent PDN connection should be established, at which point the UE 100 uses instead an IKE CREATE_CHILD_SA exchange with the ePDG 102 to create an IPSec child SA for the additional PDN connection. The IKE CREATE_CHILD_SA exchange comprises a pair of Request-Response messages and is cryptographically protected using the cryptographic algorithms and keys negotiated in the initial IKE exchange carried out at establishment of the first PDN connection as shown in step 104-112 of FIG. 1.

The UE 100 sends to the ePDG 101 an IKE CREATE_CHILD_SA Request message which may include an APN in an IDr payload, and comprises a PDN type in a CFG_REQUEST Configuration Payload. The PDN type indicates if an IPv4 or an IPv6 or an IPv4 and an IPv6 address should be configured for the PDN connection. At step 202, If the UE 100 omits the IDr payload in the IKE CREATE_CHILD_SA Request message, the ePDG 101 uses the default APN, which may be either pre-configured at the ePDG 101 or received from the AAA server 102 during the establishment of the first PDN connection. If the UE 100 provides the APN in the IDr payload, the ePDG 101 uses the APN provided by the UE. The ePDG 101 determines that UE authentication is not required because the UE is already attached to the network and that a first PDN connection is already established for the UE. The ePDG 101 uses the APN to select a PDN-GW 103 and at step 203, it sends a GTP Create Session Request to the PDN-GW 103 to establish the GTP tunnel for the IPSec child SA, i.e., the secondary IPSec tunnel. The PDN-GW 103 assigns an IPv4 address and/or an IPv6 prefix as requested by the UE 100. Thereafter, the PDN-GW 103 sends a GTP Create Session Response back to the ePDG 101 comprising the assigned IPv4 address and/or an IPv6 prefix.

Upon receiving the GTP Create Session Response at step 203, the ePDG 101 may store in the AAA server 102 the PDN-GW address used for the additional PDN connection as shown in optional step 204. The stored PDN-GW may later be retrieved and used in subsequent handovers to other radio access networks. At step 205, the ePDG 101 sends to the UE 100 the IKE CREATE_CHILD_SA Response message that includes the received IP address and/or the prefix in CFG_REPLY Configuration Payload (CP) and the used APN in the IDr payload. Additionally, the ePDG 100 includes the Traffic Selector initiator, TSi, payload set to the new assigned IPv4 address or IPv6 prefix or IPv4 address and IPv6 prefix. The UE 100 uses the received traffic selector to route traffic over a PDN connection to the corresponding established IPSec tunnel. The ePDG 101 may also include in the IKE CREATE_CHILD_SA Response message the PDN-GW IP address selected for the additional PDN connection. At step 206, the IPSec child SA or second IPSec SA/tunnel is now established and the ePDG 101 binds the additional GTP tunnel with the IPSec child SA and all traffic received from the PDN-GW 103 over the GTP tunnel of the additional PDN connection is sent to the corresponding IPSec tunnel associated to the IPSec child SA. Additionally, all traffic received from the UE 100 over the IPSec tunnel associated to the IPSec child SA will be sent to the PDN-GW 103 over the corresponding GTP tunnel. If the UE 100 determines that further additional PDN connections are required, it repeats the same procedure as illustrated in FIG. 2 and as described above.

FIG. 2 illustrates an example using GTP as the network mobility protocol between the ePDG 101 and the PDN-GW 103; however, other network mobility protocols such as Proxy Mobile IP may also be used.

FIG. 2 can also be used to illustrate a handover embodiment from an LTE access network to the untrusted WiFi access network. The handover embodiment assumes the UE 100 was first attached to an LTE radio access network where it has established multiple PDN connections and determines that a handover to untrusted WiFi access is required. The UE starts the handover by establishing the first PDN connection as per step 200 of FIG. 2. However, the UE 100 will include the previously assigned IP address of the first PDN connection (received when attached to the LTE radio access network) to indicate handover of the first PDN connection. As per the prior art, the IKE_AUTH Request message in the initial exchange includes the IP address for the first or default PDN connection.

Once the first PDN connection is established, and according to step 201, the UE 100 shall send to the ePDG 101 an IKE CREATE_CHILD_SA Request message for the additional PDN connection that is handover from the LTE access network in order to create an IPSEC child SA for the additional PDN connection. FIG. 2 illustrates one additional PDN connection, however if more than one additional PDN connection is established over the LTE network, the UE handover each of the PDN connection by sending an IKE CREATE_CHILD_SA Request message for each additional PDN connection.

In order to indicate handover of the additional PDN connection, the IKE CREATE_CHILD_SA Request message at step 201 includes the previously allocated IP address in the LTE network of the corresponding additional PDN connection. When at step 205, the UE 100 receives IKE CREATE_CHILD_SA Response message for the additional PDN connection from the ePDG 101, the message may include in a TSi payload either the previously allocated IP address in the LTE network, i.e., the same address sent by the UE 100 in the IKE CREATE_CHILD_SA Request message. When the same address is received, it confirms that session continuity is maintained. Alternatively a new IPv4 address/IPv6 prefix could be assigned by the PDN-GW 103 and returned by the ePDG 101 to the UE 100 in the IKE CREATE_CHILD_SA Response message, in which case session continuity could not be provided by the network to the UE 100. Whether the IP address is maintained or whether a new IPv4 address/IPv6 prefix is assigned, the IPv4 address/IPv6 prefix is provided by the PDN-GW 103 during the S2b GTP tunnel establishment as illustrated in step 203 of FIG. 2.

Figure 3:
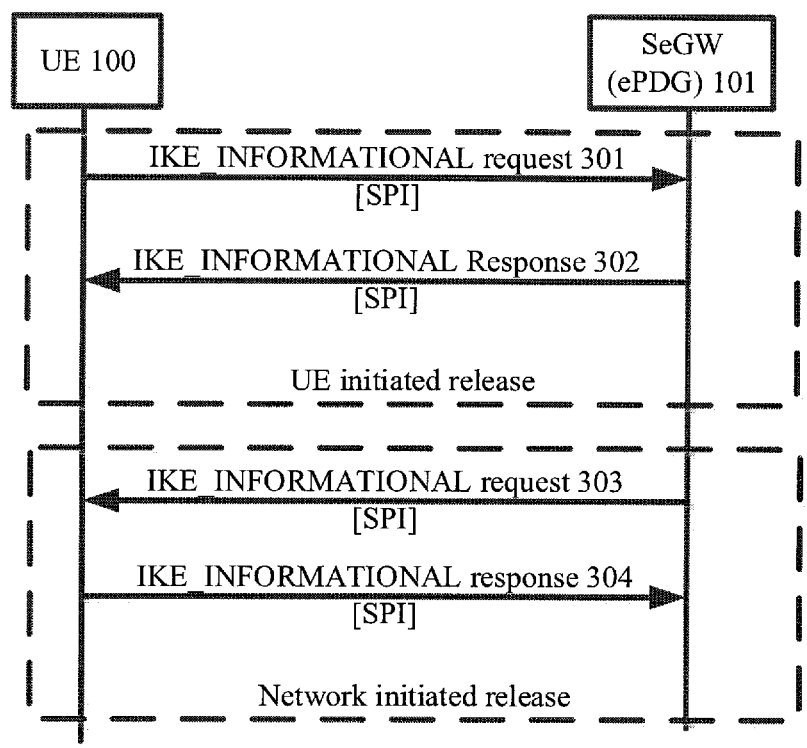
FIG. 3 illustrates a sequence diagram of releasing the subsequent PDN connections, according to an embodiment.

FIG. 3 illustrates a sequence diagram of releasing the subsequent PDN connections, according to an embodiment. According to the embodiment, the UE 100 or the ePDG 101 uses the IKE_INFORMATIONAL exchange to release the additional PDN connections associated to IPSec Child SAs. At step 301, when the UE 100 determines it should release one of the additional PDN connections that is associated to an IPSec child SA, it sends an IKE_INFORMATIONAL Request message to the ePDG 101 and includes a Delete payload that contains the Security Parameter Index, SPI, of the IPSec child SA. The ePDG 101 responds at step 302 by sending an IKE_INFORMATIONAL Response message to the UE 100 including the SPI of the IPSec child SA that is released. The ePDG 101 releases the IPSec tunnel associated to the IPSec child SA and the corresponding GTP tunnel. Note that if the UE 100 sends an IKE_INFORMATIONAL Request message that includes a Delete payload that contains the SPI of the IKE SA, the ePDG 101 will proceed to detach the UE 100 and all the PDN connections (first and subsequent) are consequently released.

Similarly at step 303, when the ePDG 101 determines it should release one of the additional PDN connections that is associated to an IPSec child SA, it sends an IKE_INFORMATIONAL Request message to the UE 100 and includes a Delete payload that contains the Security Parameter Index, SPI, of the IPSec child SA. The UE 100 responds at step 304 by sending an IKE_INFORMATIONAL Response message to the ePDG 101 including the SPI of the IPSec child SA that is being released. The ePDG 101 releases the IPSec tunnel associated to the IPSec child SA and the corresponding GTP tunnel. Note that if the ePDG sends an IKE_INFORMATIONAL Request message that includes a Delete payload that contains the SPI of the IKE SA, the UE 100 will proceed to release all PDN connections established for the UE. The ePDG 101 detaches the UE 100 and all the corresponding PDN connections (first and subsequent) are consequently released.

FIG. 4 illustrates a flowchart of a method 40 executed at a security gateway, SeGW, such as the ePDG specified in 3GPP TS 23.402. Method 40 describes establishment of additional PDN connections according to an embodiment. According to the embodiment, the SeGW at step 41, has already established the first PDN connection at a first PDN-GW with the corresponding IKE SA and first IPSec SA according to the procedure described in the prior art, i.e., completing IKE_SA_INIT and IKE_AUTH exchange as described in step 104-112 of FIG. 1. At step 42, the ePDG receives an IKE CREATE_CHILD_SA Request message (as stated above a new IKE request message can also be used) from the UE to request establishment of IPsec child SA (i.e., additional IPSec SA or tunnel) for an additional PDN connection. The IKE CREATE_CHILD_SA Request message may include the APN in the iDR payload. At step 43, the ePDG determines that it is not required to communicate with the AAA server when it receives the IKE CREATE_CHILD_SA Request message as the user/UE is already authenticated and the UE profile is already available at the ePDG as a result of establishing the first PDN connection. If the ePDG does not receive the APN in the IKE CREATE_CHILD_SA Request message, the ePDG uses the default APN that is received during the establishment of the first PDN connection to select a second PDN-GW for the additional PDN connection; else the ePDG uses the APN received from the UE. The second PDN-GW may be the same or a different PDN-GW than the first PDN-GW.

Additionally, the IKE CREATE_CHILD_SA Request message includes a PDN type that may be encoded in a CFG_REQUEST Configuration Payload. The PDN type indicates if an IPv4 or an IPv6 or an IPv4 and an IPv6 address should be configured for the additional PDN connection. If GTP is used between the ePDG and the second PDN-GW, the ePDG sends a GTP Create Session Request to the selected PDN-GW to request establishment of the additional network tunnel for the additional PDN connection. The GTP Create Session Request message includes the APN and the PDN type received by the UE. Other network mobility protocol may be used in place of GTP such a Proxy Mobile IP. The PDN-GW assigns an IP4 address and/or an IPv6 prefix depending on the received PDN type and sends a GTP Create Session Response message back to the ePDG at which point the additional GTP tunnel is established between the ePDG and the second PDN-GW. The ePDG may store the second PDN-GW address used for the additional PDN connection in the AAA server which may be used in subsequent handovers to other radio access networks.

At step 44, the ePDG sends an IKE CREATE_CHILD_SA Response message (as stated above a new IKE response message can also be used) to the UE which comprises the received IPv4 address or IPv6 prefix or IPv4 address and IPv6 prefix encoded in a CFG_REPLY Configuration Payload (CP) and the used APN for the additional PDN connection in the iDR payload. Additionally, the ePDG includes the Traffic Selector initiator, TSi, which contains the new assigned IPv4 address or IPv6 prefix or IPv4 address and IPv6 prefix. The traffic selector is used by the UE to route the traffic for a PDN connection over the corresponding established IPSec tunnel (i.e., first IPsec SA or child/additional IPsec SA). The ePDG may also include in the IKE CREATE_CHILD_SA response message the second PDN-GW IP address selected for the additional PDN connection. At this point, the Child IPSec SA/tunnel is established for the additional PDN connection. At step 45, the ePDG binds the additional GTP network tunnel established for the additional PDN connection to the child IPSec SA/tunnel so the ePDG can route traffic of the additional PDN connection to the corresponding child IPSec SA/tunnel. The ePDG routes the traffic received over the additional GTP tunnel associated to the additional PDN connection to its corresponding child IPSec SA/tunnel for delivery to the UE.

FIG. 4 can also be used to illustrate a handover embodiment from an LTE access network to the untrusted WiFi access network. The handover embodiment assumes the UE was first attached to an LTE radio access network where it has established multiple PDN connections and determines that a handover to untrusted WiFi access is required. The UE starts the handover by establishing the first PDN connection as per step 41 of FIG. 4 where the ePDG executes the initial exchange (IKE_SA_INIT and IKE_AUTH) as initiated by the UE to handover the first PDN connection. However, the UE will include the previously assigned IP address of the first PDN connection (received when attached to the LTE radio access network) to indicate handover of the first PDN connection. As per the prior art, the IKE_AUTH Request message in the initial exchange includes the IP address for the first or default PDN connection.

Once the first PDN connection is established, and according to step 42, the ePDG receives an IKE CREATE_CHILD_SA Request message to establish an IPSEC child SA to handover an additional PDN connection. FIG. 4 illustrates a method for establishing one additional PDN connection, however if more than one additional PDN connection is established over the LTE network, the UE handover each of the PDN connection by sending an IKE CREATE_CHILD_SA Request message for each additional PDN connection and step 42 to 45 in FIG. 4 are consequently repeated for each additional PDN connection.

In order to determine handover of the additional PDN connection, the IKE CREATE_CHILD_SA Request message includes the previously allocated IP address of the additional PDN connection. To maintain anchoring the additional PDN connection to the same PDN-GW, the IKE CREATE_CHILD_SA Request message could include the APN used to establish the PDN connection in the previous radio access network. Alternatively, the message may include the PDN-GW IP address used for anchoring the additional PDN connection, provided the UE has previously received and stored the information. In yet another alternative to select the same PDN-GW at handover, the ePDG could receive the previously allocated PDN-GW addresses for each of the PDN connections from the AAA server during the first PDN connection establishment.

According to step 44, when the ePDG sends an IKE CREATE_CHILD_SA Response message for an additional PDN connection to the UE, the message may include in a TSi payload the previously allocated IP address in the LTE network, as previously received in the IKE CREATE_CHILD_SA Request message, in which case, session continuity is assured or a new IPv4 address/IPv6 prefix may be assigned by the PDN-GW.

To conclude, whether it is an initial establishment of multiple PDN connections or handover of multiple PDN connections, the method steps of method 40 in FIG. 4 are the same. The difference lies in the attributes that are comprised in the IKE CREATE_CHILD_SA request message notably, the presence of the previously allocated IP address attribute and/or the previously used PDN-GW address attribute.

FIG. 5 illustrates a flowchart of a method 50 executed at a user equipment, UE, of establishing an additional PDN connection according to an embodiment. According to the embodiment, the UE, at step 51, has already established the first PDN connection with the corresponding IKE SA and first IPSec SA/tunnel according to the procedure described in current 3GPP TS 23.402 and 3GPP TS 24.302. At step 52, the UE determines that an additional PDN connection is required and sends an IKE CREATE_CHILD_SA Request message to the SeGW (e.g., ePDG) to request establishment of a child IPSec SA/additional IPSec tunnel for the additional PDN connection. Again, a new IKE request message could be used instead of an enhanced IKE CREATE_CHILD_SA request message. The IKE CREATE_CHILD_SA Request message may include the APN in the iDR payload and includes a PDN type in a CFG_REQUEST Configuration Payload. The PDN type indicates if an IPv4 or an IPv6 or an IPv4 and an IPv6 address should be configured for the additional PDN connection. Upon receiving the IKE CREATE_CHILD_SA Request message from the UE, the SeGW executes the steps as described in method 40 above. At step 53, the UE receives an IKE CREATE_CHILD_SA Response message from the SeGW which includes the received IPv4 address or IPv6 prefix or IPv4 address and IPv6 prefix in CFG_REPLY Configuration Payload (CP) and the used APN by the SeGW in the iDR payload. The Response message may also include the PDN-GW IP address selected by the ePDG for the additional PDN connection. Additionally, the IKE CREATE_CHILD_SA Response message includes the Traffic Selector initiator, TSi, indicating the new assigned IPv4 address or IPv6 prefix or IPv4 address and IPv6 prefix. The Child IPSec SA/additional IPSec tunnel is now established. At step 54, the UE binds the additional PDN connection to the child IPSec SA/additional IPSec tunnel. As each PDN connection has a unique IP address (or dual-stack IPv4-IPv6 address), the UE uses the traffic selector, TSi, to route uplink traffic having a source IP address equal to the assigned IP address of a PDN connection to the corresponding established IPSec tunnel.

It is important to note that the traffic selector as specified in this disclosure is used to route traffic among multiple IPSec tunnels within the same IKE SA as each additional PDN connection, established after the first PDN connection, is associated to a child IPSec SA. This in contrast to the current art described in 3GPP standard where the traffic selector is used for traffic routing between IPSec tunnels of multiple IKE SA as each additional PDN connection in current art has also its associated IKE SA.

Additionally, if a UE is attached to an LTE radio access network or other radio network where it has established multiple PDN connections performs a handover to an untrusted WiFi network; the UE will include the previously allocated IP addresses in the LTE radio access network when it requests establishment of the PDN connections over the untrusted WiFi network. This would allow anchoring the PDN connections to the same PDN-GW. According to step 51 of FIG. 5, the UE starts the handover with the initial exchange (IKE_SA_INIT and IKE_AUTH) where the IKE_AUTH Request message includes the IP address for the first or default PDN connection. Once the first PDN connection is established, and according to step 52, the UE sends an IKE CREATE_CHILD_SA Request message for the additional PDN connection that is handover from the previous radio access network to negotiate an IPSEC child SA for the additional PDN connection. The IKE CREATE_CHILD_SA Request message includes the previously allocated IP address of the corresponding additional PDN connection to indicate handover of the additional PDN connection. The UE also includes in the message the APN used to establish the additional PDN connection and may include the PDN-GW IP address used for the additional PDN connection if received over the previous access network. The child IPSec SA and the corresponding additional PDN connection are established when the UE receives an IKE CREATE_CHILD_SA response message as shown in step 53.

To conclude, whether it is an initial establishment of multiple PDN connections or handover of multiple PDN connections, the method steps of method 50 in FIG. 5 are the same. The difference lies in the attributes that are comprised in the IKE CREATE_CHILD_SA request message notably, the presence of the previously allocated IP address attribute and/or the previously used PDN-GW address attribute.

In one embodiment illustrated in FIG. 6, a SeGW (e.g., ePDG) comprises a circuitry 60 which executes the method steps according to the embodiments as described in FIG. 4, along with steps 201-204 of FIG. 2 and steps 301-304 of FIG. 3 in addition to other embodiments described herein. In one embodiment, the circuitry 60 may comprise a processor 61 and a storage 62 (also referred to as memory) containing instructions, which when executed, cause the processor 60 to perform the steps in a method according to embodiments described herein. The circuitry 60 may further comprise a communication interface 63 to communicate with external entities such as with UE devices using IKE and IPSec tunnels and with PDN-GWs using GTP or proxy Mobile IP.

An additional embodiment in FIG. 7 illustrates a UE comprising a circuitry 70 which executes the method steps according to the embodiments as described in FIG. 5, along with steps 201 and 204 of FIG. 2 and steps 301-304 of FIG. 3 in addition to other embodiments described herein. In one embodiment, the circuitry 70 may comprise a processor 71 and a storage 72 (also referred to as memory) containing instructions, which when executed, cause the processor 70 to perform the steps in a method according to embodiments described herein. The circuitry 70 may further comprise a communication interface 73 to communicate with external entities such SeGW (e.g., ePDG) using IKE and IPSec tunnels.

FIG. 8 illustrates an exemplary embodiment of a UE 80 comprising a processing module 81 to establish through a communication module 83 a first PDN connection over the untrusted access network with a security gateway, SeGW. The PDN connection establishment comprises establishment of an IKE SA, and of a first IPsec SA. The processing module 81 obtains through the communication module 83 an IKE request message to establish an additional IPSec SA, the IKE request message comprises a PDN type for an additional PDN connection and wherein the IKE request message is cryptographically protected using cryptographic algorithms and keys established in the IKE SA. The IKE request message may be a new IKE message or an enhanced IKE CREATE_CHILD_SA request message. The processing module 81 receives through the communication module 83 an IKE response message indicating establishment of the additional PDN connection with the EPC and establishment of the additional IPSec SA, where the IKE response message comprises a UE assigned address information by the EPC over the additional PDN connection. Subsequently, the processing module 81 stores the received UE assigned address and the additional IPSec SA in the storage module 82 and binds the additional IPSec SA to the established additional PDN connection. The processing module 81 sends the IP packets associated with the additional PDN connection over the established additional IPSec tunnel through the communication module 83.

A person skilled in the art would understand that the modules can be implemented as a computer program running on a processor and that the modules are operative to execute the steps of the previously described method.

The invention has been described with reference to particular embodiments. However, it will be readily apparent to those skilled in the art that it is possible to embody the invention in specific forms other than those of the embodiments described above. The described embodiments are merely illustrative and should not be considered restrictive in any way. The scope of the invention is given by the appended claims, rather than the preceding description, and all variations and equivalents that fall within the range of the claims are intended to be embraced therein.

What is claimed is:

1. A method in a security gateway for establishing an additional packet data network (PDN) connection over an untrusted access network to a packet data gateway (PDN-GW) in an evolved packet core network (EPC), the method comprising:
    establishing a first PDN connection over the untrusted access network comprising establishing an Internet Key Exchange Security Association (IKE SA) and a first Internet Protocol Security (IPSec SA) with a User Equipment (UE) and establishing a first network tunnel with a first PDN-GW;
    receiving an IKE request message for establishing an additional IPSec SA, the IKE request message comprising a PDN type for an additional PDN connection, wherein the IKE request message is cryptographically protected using cryptographic algorithms and keys negotiated in the IKE SA establishment;
    determining an Access Point Name (APN) for the additional PDN connection and selecting a second PDN-GW in the EPC for establishing an additional network tunnel associated with the additional IPSec SA;
    sending an IKE response message indicating establishment of the additional PDN connection with the second PDN-GW and establishment of the additional IPSec SA, the IKE response message comprising a UE assigned address information over the additional PDN connection;
    binding the additional IPSec SA to the additional network tunnel for the additional PDN connection; and
    using an IKE Informational message to release the additional PDN connection, the IKE Informational message comprising a delete payload indicating a security parameter index corresponding to the additional IPSec SA associated with the additional PDN connection.

2. The method of claim 1, wherein the IKE request message comprises the APN.

3. The method of claim 2, wherein the APN is included in an identification payload.

4. The method of claim 1, wherein the PDN type is one of an Internet Protocol version four (IPv4), an Internet Protocol version 6 (IPv6), and simultaneous IPv4 and IPv6 address type.

5. The method of claim 4, wherein the PDN type for the additional PDN connection is included in an IKE Configure Request Configuration Payload (CFG_REQUEST CP).

6. The method of claim 1, wherein the IKE request message comprises a previously allocated IP address indicating handover of the additional PDN connection.

7. The method of claim 6, wherein the IKE request message comprises at least one of a previously used APN and a previously used PDN-GW address.

8. The method of claim 6, wherein the previously allocated IP address is encoded in a traffic selector payload.

9. The method of claim 1, wherein the step of determining the APN further comprises:
    if the APN is included in the IKE request message, storing the APN and associating the APN to the additional PDN connection;
    else, using a default APN from a subscription profile associated to the UE and using the default APN to the additional PDN connection.

10. The method of claim 1, wherein the IKE response message further comprises the APN in an identification payload, the APN used for selection of the second PDN-GW.

11. A security gateway for establishing an additional packet data network (PDN) connection for a User Equipment (UE) in an untrusted access network to a packet data gateway (PDN-GW) in an evolved packet core network (EPC), the security gateway comprising a circuitry configured to:
    establish a first PDN connection over the untrusted access network comprising establishment of an Internet Key Exchange Security Association (IKE SA) and of a first Internet Protocol Security (IPSec SA) with the UE and establishment of a first network tunnel with a first PDN-GW;
    receive an IKE request message for establishing an additional IPSec SA, the IKE request message comprising a PDN type for an additional PDN connection, wherein the IKE request message is cryptographically protected using cryptographic algorithms and keys negotiated in the IKE SA establishment;
    determine an Access Point Name (APN) for the additional PDN connection and select a second PDN-GW in the EPC for establishment of an additional network tunnel associated with the additional IPSec SA;

send an IKE response message to indicate establishment of the additional PDN connection with the second PDN-GW and establishment of the additional IPSec SA, the IKE response message comprising a UE assigned address information over the additional PDN connection;

bind the additional IPSec SA to the additional network tunnel for the additional PDN connection; and use an IKE Informational message to release the additional PDN connection, the IKE Informational message comprising a delete payload indicating a security parameter index corresponding to the additional IPSec SA associated with the additional PDN connection.

12. The security gateway of claim 11, wherein the circuitry comprises a processor, a communication interface, and a memory, the memory containing instructions executable by the processor.

* * * * *